(12) United States Patent
Jeong et al.

(10) Patent No.: US 10,496,281 B2
(45) Date of Patent: Dec. 3, 2019

(54) DATA STORAGE DEVICE, DATA PROCESSING SYSTEM AND METHOD OF OPERATION

(71) Applicants: Ha Neul Jeong, Suwon-si (KR); Ki Jo Jung, Gwacheon-si (KR)

(72) Inventors: Ha Neul Jeong, Suwon-si (KR); Ki Jo Jung, Gwacheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 69 days.

(21) Appl. No.: 14/873,665

(22) Filed: Oct. 2, 2015

(65) Prior Publication Data
US 2016/0132237 A1 May 12, 2016

(30) Foreign Application Priority Data
Nov. 12, 2014 (KR) .................. 10-2014-0157400

(51) Int. Cl.
*G06F 12/00* (2006.01)
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ...... G06F 3/061; G06F 3/0659; G06F 3/0689; G06F 3/01
See application file for complete search history.

(56) References Cited

U.S. PATENT DOCUMENTS

| 6,134,631 | A | * | 10/2000 | Jennings, III | .......... H04N 19/61 348/266 |
| 6,549,977 | B1 | | 4/2003 | Horst et al. | |
| 6,571,293 | B1 | * | 5/2003 | Hong | .................. G06F 13/4226 709/232 |

(Continued)

FOREIGN PATENT DOCUMENTS

| CN | 101256470 A | 9/2008 |
| CN | 102306046 A | 1/2012 |

(Continued)

OTHER PUBLICATIONS

"Serial ATA Advanced Host Controller Interface".
Chinese Office Action dated Aug. 29, 2019, Cited in Related Chinese Application No. CN 201510763404.0.

*Primary Examiner* — Ryan Bertram
*Assistant Examiner* — Trang K Ta
(74) *Attorney, Agent, or Firm* — Volentine, Whitt & Francos, PLLC

(57) ABSTRACT

A data processing system includes a host capable of pipelining execution of a command set including a plurality of commands by storing the commands in a buffer, and a data storage device including a NVMe controller that receives the commands and controls execution of data access operations corresponding to the respective commands, generates a completion response upon successfully executing each one of the commands, and stores the resulting completion responses in a buffer, wherein the NVMe controller extracts at least two of the completion responses stored in the buffer to generate a completion packet and transmits the completion packet to the host during a single transaction.

19 Claims, 12 Drawing Sheets

(56) References Cited

U.S. PATENT DOCUMENTS

| | | | |
|---|---|---|---|
| 7,096,252 B1* | 8/2006 | Hvostov | H04L 29/06 709/203 |
| 8,554,968 B1* | 10/2013 | Onufryk | G06F 13/24 710/260 |
| 8,677,042 B2 | 3/2014 | Gupta et al. | |
| 8,812,889 B2 | 8/2014 | Fullerton et al. | |
| 8,966,164 B1* | 2/2015 | Asnaashari | G06F 12/0246 711/103 |
| 9,378,049 B1* | 6/2016 | Johnson | G06F 9/467 |
| 2004/0125415 A1* | 7/2004 | Michiie | H04N 1/00933 358/444 |
| 2008/0071972 A1* | 3/2008 | Kimura | G06F 1/305 711/103 |
| 2008/0209103 A1 | 8/2008 | Haga | |
| 2009/0287888 A1 | 11/2009 | Ishizaki | |
| 2010/0211738 A1* | 8/2010 | Abeling | G06F 3/0608 711/114 |
| 2013/0166855 A1* | 6/2013 | Batwara | G06F 3/0608 711/154 |
| 2013/0198312 A1 | 8/2013 | Tamir et al. | |
| 2013/0227347 A1 | 8/2013 | Cho et al. | |
| 2013/0297832 A1 | 11/2013 | Ahmad et al. | |
| 2014/0025771 A1* | 1/2014 | Tanaka | G06F 15/167 709/213 |
| 2014/0047166 A1 | 2/2014 | Asnaashari et al. | |
| 2014/0143454 A1* | 5/2014 | Hayut | G06F 3/016 710/19 |
| 2014/0189212 A1 | 7/2014 | Slaight et al. | |
| 2015/0134857 A1* | 5/2015 | Hahn | G06F 3/061 710/5 |
| 2015/0261446 A1* | 9/2015 | Lee | G06F 13/385 711/103 |
| 2015/0317091 A1* | 11/2015 | Hussain | G06F 3/0688 711/103 |
| 2015/0356033 A1* | 12/2015 | Rose | G06F 13/1642 710/310 |
| 2016/0124874 A1* | 5/2016 | Hassan | G06F 13/24 710/263 |

FOREIGN PATENT DOCUMENTS

| | | |
|---|---|---|
| CN | 103248467 A | 8/2013 |
| JP | 402110757 A * | 4/1990 |
| JP | H02110757 A | 4/1990 |
| KR | 20130040486 A | 4/2013 |
| KR | 20130098642 A | 9/2013 |
| KR | 20140034333 A | 3/2014 |
| KR | 20140044640 A | 4/2014 |

* cited by examiner

DATA STORAGE DEVICE, DATA PROCESSING SYSTEM AND METHOD OF OPERATION

CROSS-REFERENCE TO RELATED APPLICATION

This application claims priority under 35 U.S.C. § 119(a) from Korean Patent Application No. 10-2014-0157400 filed on Nov. 12, 2014, the disclosure of which is hereby incorporated by reference in its entirety.

BACKGROUND

Embodiments of the inventive concept relate to data processing devices, and more particularly to data storage devices that store completion packets in a buffer, wherein each completion packet corresponds to a number of commands received from a host, and that sequentially transmits the stored completion packets to the host in a single transaction. Other embodiments of the inventive concept relate to methods of operating a data storage device, as well as methods of operating data processing systems including this type of data storage device.

In order to perform a write operation, a memory device generally receives a write command, a write address and (payload) write data from a host. Here, the write address may be part of the write command. Upon receiving the write command and write data, the memory device writes the write data in a memory region of the memory device designated by the write address. Once the write data has been successfully written, the memory device may immediately transmit a write operation completion indication (e.g., a write completion response).

Similarly, in order to perform a write operation, a memory device receives a read command including a read address identifying a memory region of the memory device at which read data is stored. Here again, once the read data has been successfully read, the memory device may immediately transmit a read operation completion indication (e.g., a read completion response). Hence, following completion of a write operation indicated by a write command or completion of a read operation indicated by a read command, a data storage device may immediately transmit a corresponding completion response to the host requesting the write/read operation. Read and/or write operations may hereafter be singularly or collectively referred to as data access operation(s).

In this regard, even under circumstances where a data storage device is configured to process multiple data access operations in a burst mode, the data storage device may nonetheless transmit respective completion response for each data access operation upon its completion. This approach essentially obviates the use of the burst mode as the sequential transmission of multiple data sets arising from respective data access operations is interrupted (or disconnected) by the reoccurring need to transmit completion responses to a requesting host. The result of this outcome reduces the overall data access performance of the data storage device and data processing systems.

SUMMARY

Embodiments of the inventive concept provide a data storage device that need not immediately transmit completion response(s) to a host whenever a respective data access operation, among a sequence of data access operations being performed, is completed. This capability improves performance of the data storage device and data processing systems In some embodiments of the inventive concept, respective response completions associated with a sequence of data access commands may be stored in a buffer. Then, once the sequence of data access operations is fully executed, the stored completion responses may be sequentially transmitted (or dumped) from the buffer to the requesting host during a single data transaction. Certain embodiments of the inventive concept relate to methods of operating a data storage device and/or data processing system in the foregoing manner.

In one embodiment the inventive concept provides a method of operating a data storage device receiving a command set including at least one command from a host. The method includes for each command in the command set; generating a completion response upon completing a corresponding data access operation indicated by the command, and storing the completion response in a buffer of the data storage device to generate a completion packet including completion responses for at least one command of the command set, and thereafter, transmitting the completion packet stored in the buffer to the host during a single transaction.

In another embodiment the inventive concept provides a method of operating a data storage device receiving a plurality of commands from a host, the method including; for each command, generating a completion response upon completing a corresponding data access operation indicated by the command, and storing the completion response in a buffer in the data storage device, using a Non-Volatile Memory Express (NVMe) controller, extracting one or more completion responses stored in the buffer to generate at least one completion packet, and transmitting a completion packet of the at least one completion packet to the host during a single transaction.

In another embodiment the inventive concept provides a data storage device including a buffer, a non-volatile memory, a memory controller that controls operation of the non-volatile memory, and a Non-Volatile Memory express (NVMe) controller that generates a completion response whenever a data access operation indicated by a command fetched from a host is completed, stores the generated completion response in the buffer, and transmits a completion packet including a plurality of completion responses stored in the buffer to the host during a single transaction.

In another embodiment the inventive concept provides a data processing system including; a host capable of pipelining execution of a command set including a plurality of commands by storing the commands in a buffer and a data storage device comprising a Non-Volatile Memory express (NVMe) controller that receives the commands and controls execution of data access operations corresponding to the respective commands, generates a completion response upon successfully executing each one of the commands, and stores the resulting completion responses in a buffer, wherein the NVMe controller extracts at least two of the completion responses stored in the buffer to generate a completion packet and transmits the completion packet to the host during a single transaction.

BRIEF DESCRIPTION OF THE DRAWINGS

These and/or other aspects and advantages of the inventive concept will become apparent and more readily appreciated from the following description of embodiments in conjunction with the accompanying drawings of which.

DETAILED DESCRIPTION

Figure 1:
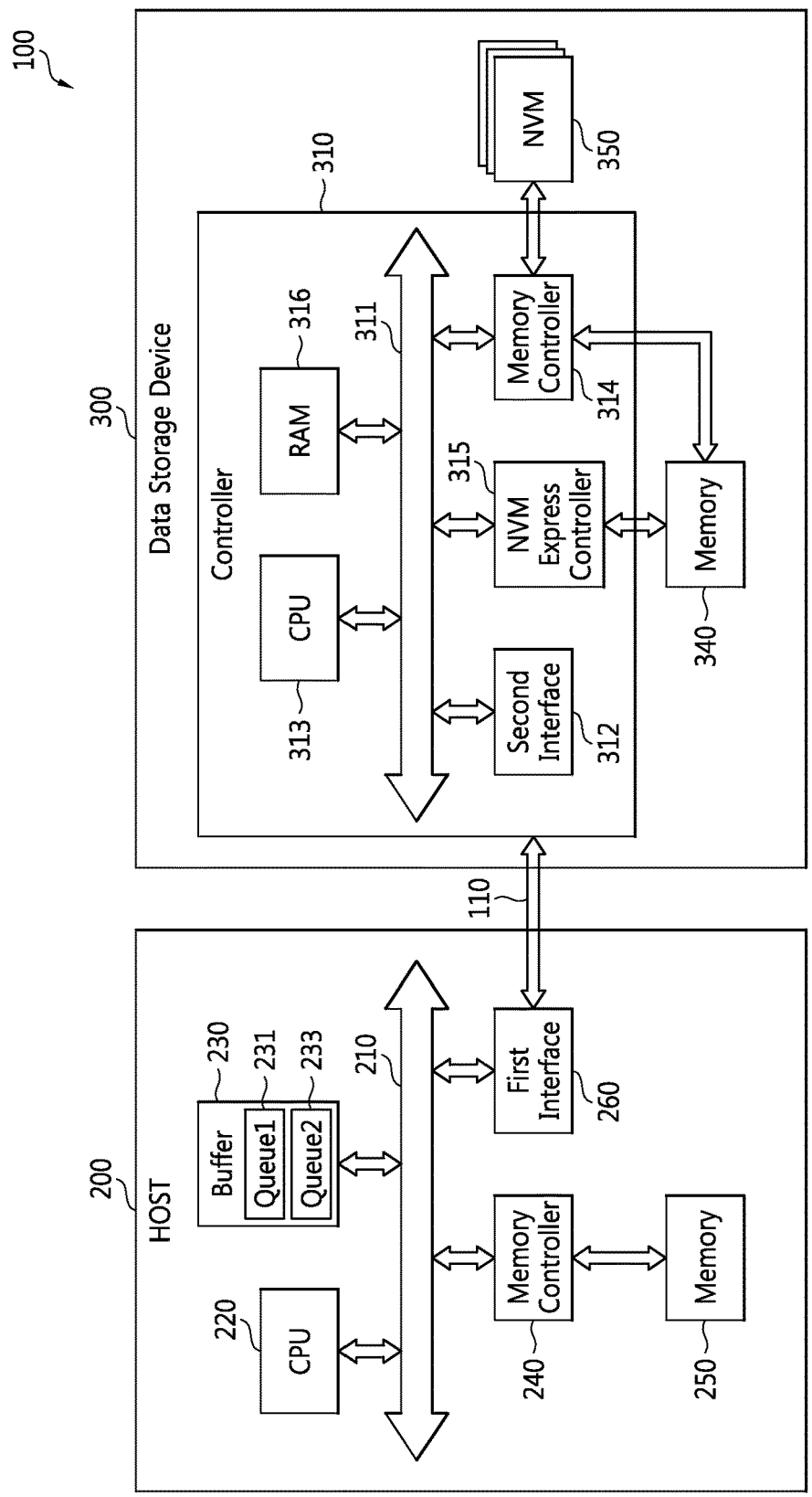
FIG. 1 is a block diagram of a data processing system according to an embodiment of the inventive concept.

Embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The terms Non-Volatile Memory (NVM) Express (NVMe) and NVM Host Controller Interface Specification (NVM-HCI) refer to devices and related methods of controlling such devices capable of accessing solid-state drives/disks (SSDs) connected via a Peripheral Component Interconnect Express (PCIe) bus. Various forms of these devices and control methods are commercially understood by those skilled in the art. In this regard, background reference may be had to NVMe Revision 1.1b published at http://www.nvmexpress.org (Jul. 2, 2014). As may be understood from this background material, contemporary NVMe devices/methods support the use of multiple outstanding commands (i.e., a sequence of multiple, to-be-executed commands) transmitted during a defined period of time from a host to a data processing system configured according to NVMe/NVM-HCI specifications. Because many NVMe-capable devices/methods support the use of multiple outstanding commands, such devices/methods are able to issue a next command in a sequence of data access commands without waiting for completion of one or more previously issued data access commands. Stated in other terms, devices configured according to NVMe/NVM-HCI specifications may 'pipeline' a sequence of data access commands between a host and data processing system.

FIG. 1 is a block diagram illustrating a data processing system 100 according to an embodiment of the inventive concept. The data processing system 100 generally includes a host 200 and a data storage device 300 connected via an interface 110.

The data processing system 100 may be embodied as a server computer, a personal computer (PC), a desk-top computer, a lap-top computer, a workstation computer, a network-attached storage (NAS), a data center, an internet data center (IDC), or a mobile computing device. For example, the mobile computing device may be embodied as a smart phone, a tablet PC, or a mobile internet device (MID).

The host 200 may be used to control execution of one or more data access operations by the storage device 300. The host 200 may include a CPU 220, a buffer 230, a memory controller 240, a memory 250, and a first interface 260. A block diagram of the host 200 shown in FIG. 1 is exemplarily shown for convenience of description, and a technical concept of the inventive concept is not limited to the block diagram shown in FIG. 1.

The host 200 may be embodied as an integrated circuit (IC), a motherboard, or a system on chip (SoC). According to an embodiment, the host 200 may be embodied as an application processor (AP) or a mobile AP.

The CPU 220 may transmit or receive a command and/or data to or from the buffer 230, the memory controller 240, and the first interface 260 through a bus architecture 210. For example, the bus architecture (or bus) 210 may be embodied in an advanced microcontroller bus architecture (AMBA™), an advanced high-performance bus (AHB), an advanced peripheral bus (APB), an advanced eXtensible interface (AXI), AXI Coherency Extensions (ACE); or an advanced system bus (ASB); however, it is not limited thereto.

The CPU 220 may be used to generate a data access command (e.g., one or more write and/or read commands) as described hereafter. The CPU 220 may be a processor which can perform a program(s) capable of performing operations according to an embodiment of the inventive concept.

The buffer 230 may store a first queue 231 and a second queue 233. According to an embodiment, the buffer 230 may be embodied as a register or a static random access memory (SRAM). The first queue 231 may be a submission queue, and the second queue 233 may be a completion queue, for example, where the first queue 231 store data access commands.

The memory controller 240 may be used to write data in the memory 250 or read data from the memory 250 under the control of the CPU 220. Thus, the memory controller 240 may function, at least in part, as a direct memory access (DMA) controller.

The memory 250 may be embodied as a volatile memory and/or a non-volatile memory. The volatile memory may be embodied as a random access memory (RAM), a SRAM, or a dynamic RAM (DRAM). The non-volatile memory may be embodied as a hard disk drive (HDD), a NAND flash memory, a NOR flash memory, a phase change RAM (PRAM), a magnetoresistive RAM (MRAM), a spin-transfer torque magnetic random-access memory (STT-MRAM), a ferroelectric RAM (FRAM), or a resistive RAM (RRAM).

The data processing system of FIG. 1 shows one memory controller 240 and one memory 250, but the memory controller 240 may include a plurality of memory controllers, and the memory 250 may include a plurality of memories of the same or different type. For example, where the plurality of memories includes a DRAM and a NAND flash memory, the plurality of memory controllers might include a DRAM controller and a NAND flash memory.

For convenience of description in FIG. 1, the buffer 230 is assumed to include buffer regions storing queues 231 and 233. However, the queues 231 and 233 might alternately be stored in the memory 250.

The first interface 260 may be connected to a second interface 312 of the data storage device 300 via the interface 110. Here, in certain embodiments of the inventive concept, each of interfaces 110, 260, and 312 may support a PCIe protocol, but the scope of the inventive concept is not limited thereto. For example, the interface 110 may be a serial ATA (SATA) interface, and each of the interfaces 260 and 312 may be a PCIe interface, where each of the interfaces 260 and 312 performs a protocol conversion between the SATA interface and a PCIe interface.

The data storage device 300 may include a controller 310, a memory 340, and a non-volatile memory 350. The data storage device 300 may be embodied as a flash-based memory device. For example, the data storage device 300 may be embodied as a solid-state drive (SSD), an embedded SSD (eSSD), a universal flash storage (UFS), a multimedia card (MMC), or an embedded MMC (eMMC). Alternately, the data storage device 300 may be embodied as a hard disk drive (HDD).

In certain embodiments, the data storage device 300 may be mechanically connected to/disconnected from the host 200, and may be embodied as a memory module.

The data storage device 300 of FIG. 1 will generate and provide a "completion packet" whenever a command set of data access operation(s) (e.g., one or more write operations and/or read operations) executed in response to corresponding data access command (e.g., one or more write commands and/or read commands) is completed. Respective completion responses may be stored in a buffer as part of generating the completion packet. That is, the data storage device 300 of FIG. 1, unlike conventionally configured data storage devices, need not immediately transmit a completion response following the completion of each data access operation. Instead, one of more completion response(s) generated by completion of one or more data access operation(s) during a defined time period (or as the result of some other condition) may be collectively stored in the buffer to generate a completion packet.

Once a completion packet (or a group of completion packets) has been stored in the buffer, the data storage device 300 may transmit a completion packet to the host 200 during a single transaction. In this regard, the term "single transaction" may be considered a single data transfer operation performed in response to a corresponding single command received from a host. For example, a data storage device according to an embodiments of the inventive concept may accumulate in a buffer a number of completion responses corresponding to a number of data access commands in a command set received from a host, and then transmit the accumulated response commands, as a single completion packet, to the host in response to a single buffer dumping command.

The controller 310 may be used to control the transmission of commands and/or data between the host 200, memory 340, and non-volatile memory 350. The controller 310 may include a second interface 312, a CPU 313, a memory controller 314, an NVMe controller 315, and a RAM 316; however, it is not limited thereto. The second interface 312 may transmit a command and/or data to, or receive a command and/or data from the first interface 260 of the host 200 via the interface 110.

The CPU 313 may be used to control operation of the second interface 312, memory controller 314, NVMe controller 315, and RAM 316 via the bus architecture 311. Although, only one CPU 313 is shown in FIG. 1 it may in certain embodiments include a first CPU controlling interaction (e.g., transmission or reception of command(s) and/or data) with the host 200 and a second CPU controlling interaction with the non-volatile memory 350. In such an example, the first CPU may control operation of the second interface 312 and the second CPU may control operation of the memory controller 314 and/or the NVMe controller 315.

For example, the second interface 312, CPU 313, memory controller 314, NVMe controller 315, and RAM 316 may transmit or receive command(s) and/or data via the bus architecture 311, where the bus architecture 311 may be any one of an AMBA, AHB, APB, AXI, ACE, or ASB as described above.

The memory controller 314 may write data in the memory 340 or read data from the memory 340 under the control of the CPU 313. Moreover, the memory controller 314 may write data in the non-volatile memory 350 or read data from the non-volatile memory 350 according to a control of the CPU 313. For example, when the non-volatile memory 350 is embodied as a flash memory, the memory controller 314 may perform a function of a flash memory controller. The flash memory may be a NAND flash memory or an NOR flash memory.

The NVMe controller 315 may write data in the memory 340 or read data from the memory 340 under the control of the CPU 313. Moreover, the NVMe controller 315 may generate a completion response whenever a data access operation corresponding to a data access command is completed, and store the generated completion response in the RAM 316 or memory 340. Here, the RAM 316 (e.g., a SRAM) may serve as a buffer storing a queue capable of storing one or more completion responses.

The memory 340 may be embodied as a volatile memory like a DRAM. FIG. 1 shows an embodiment in which the RAM 316 and the memory 340 separate from each other, but this need not always be the case and RAM 316 and memory 340 may be one memory, where the RAM 316 is a designated part of the memory 340. The non-volatile memory 350 may be embodied as a flash memory (for example, a NAND flash memory or a NOR flash memory); however, it is not limited thereto. The non-volatile memory 350 may include a plurality of flash memory chips. Each of the flash memory chips may include a two dimensional (2D) memory cell array or a three dimensional (3D) memory cell array.

In certain embodiments of the inventive concept, the 3D memory cell array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the inventive concept, the 3D memory cell array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235, and published U.S. Patent Application 2011/0233648.

Figure 2:
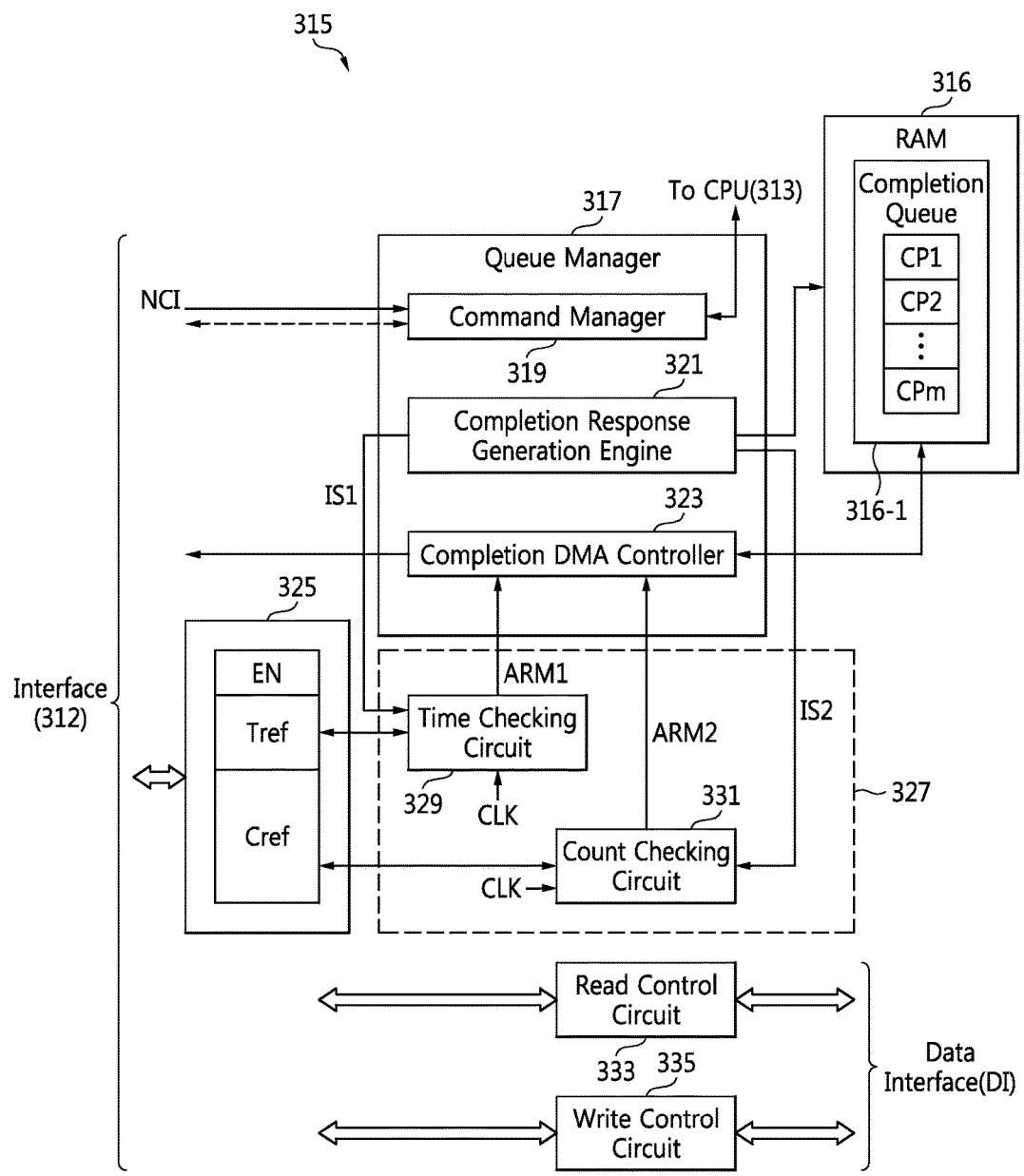
FIG. 2 is a block diagram further illustrating in one example the NVMe controller of FIG. 1.

FIG. 2 is a block diagram further illustrating in one example the NVMe controller 315 of FIG. 1. Referring to FIGS. 1 and 2, the NVMe controller 315 includes a queue manager 317, a configuration register 325, and a condition determination circuit 327. In certain embodiments, the condition determination circuit 327 may include a time checking circuit 329 and a count checking circuit 331. The NVMe controller 315 may further include a read control circuit 333 controlling the execution of read operations and a write control circuit 335 controlling the execution of write operations.

For convenience of description, FIG. 2 shows the NVMe controller 315 and the RAM 316 together. Thus, in this configuration, the RAM 316 may be used as completion response buffer or completion response queue. The queue manager 317 may be embodied as hardware, firmware, and/or software.

The queue manager 317 may be used to generate a completion response whenever a data access operation corresponding to a data access command is completed, and store the generated completion response in the RAM 316 (hereinafter referred to the "buffer"). In this context, a completion response may be generated by a completion response generation engine 321. The queue manager 317 may fetch one or more completion responses CP1 to CPm stored in the buffer 316 and transmit the one or more completion responses CP1 to CPm, as a completion packet, to the host 200 via elements 311, 312, and 110 in response to at least one indication signal ARM1 and/or ARM2 provided by the condition determination circuit 327.

The condition determination circuit 327 may receive condition information stored in the configuration register 325, and generate at least one indication signal ARM1 and/or ARM2 when a condition corresponding to the condition information is satisfied. The NVMe controller 315, e.g., a completion DMA controller 323, may fetch stored completion responses CP1 to CPm from the buffer 316 in response to at least one indication signal ARM1 and/or ARM2, and transmit same the host 200 as a completion packet during a single data transmission transaction.

When the condition determination circuit 327 includes the time checking circuit 329 and/or the count checking circuit 331, the queue manager 317 may fetch the stored completion responses CP1 to CPm from the buffer 316 and transmit same as a completion packet to the host 200 via elements 311, 312, and 110 in response to a first indication signal ARM1 provided by the time checking circuit 329 and/or a second indication signal ARM2 provided by the count checking circuit 331. A fetch operation directed to the stored completion responses may be performed by the completion DMA controller 323.

In the illustrated embodiment of FIG. 2, the command manager 319 may receive from the host 200 certain indication data (or indication information—NCI) that indicates a number of commands stored in a first queue 231 of the buffer 230 of the host 200. Queued commands may therefore be fetched by the CPU 313 in accordance with the received indication data NCI.

Firmware associated with the CPU 313 may be used to control operation of the NVMe controller 315 in response to enable information EN (e.g., one or more control bits) stored in the configuration register 325. Accordingly, the NVMe controller 315 may control the transmission of completion responses CP1 to CPm stored in the buffer 316 to the host 200 during a single transaction. In this regard, certain embodiments of the inventive concept configure the 'unitary' completion packet (i.e., a single data structure configured for transmission during a single transaction) from the completion responses CP1 to CPm stored in the buffer 316 using a second queue 233. Once the completion packet is transmitted to the host 200, the data storage device 300 may transmit an interrupt indicating completion of the one or more data access commands associated with the plurality of completion responses CP1 to CPm to the host 200. The host 200 may read the plurality of completion responses CP1 to CPm from the second queue 233 and complete processing for the associated data access commands in response to the interrupt.

The configuration register 325 may be embodied as a special function register (SFR). The configuration register 325 may include a region storing enable information EN and a region storing condition information, where the condition information includes, for example, a reference time count value Tref and a reference count value Cref. Here, the enable information EN and the condition information may be set by the CPU 220 of the host 200.

The time checking circuit 329 may develop a count associated with operation time in response to a clock signal CLK and further in response to a third indication signal IS1. Once a time count value has been generated, it may be compared with a reference time count value Tref in order to generate the first indication signal ARM1 according to the comparison result.

The count checking circuit 331 may be used to count a number of the completion responses stored in the buffer 316 in relation to the clock signal CLK, generate a count value based on a result of the counting, compare a generated count value with a reference count value Cref, and generate a second indication signal ARM2 according to a result of the comparison. According to an embodiment, the reference count value Cref may be provided to a completion direct memory access (DMA) controller 323.

The time checking circuit 329 and/or the count checking circuit 331 may count operation time and/or a number of generated completion responses by monitoring an operation (e.g., a completion packet generation operation) of a completion response generation engine 321 for each command set. Here, a "command set" may include one or more commands grouped according to one or more defined criteria such as sequential time relationship, for example. The completion response generation engine 321 may transmit a third indication signal IS1 which indicates a completion packet is generated for a first time for each command set to the time checking circuit 329. At this time, the time checking circuit 329 may count operation time for the each command set using the third indication signal IS1 and the clock signal CLK, and generate a count value.

The count checking circuit 331 may provide a fourth indication signal IS2 that indicates that one or more completion response(s) have been generated in response to one or more data access command(s) in a command set using the clock signal CLK, and generate a count value.

When buffered completion responses fetched by the queue manager 317 are completely transmitted to the host 200, the time checking circuit 329 and/or the count checking circuit 331 may be re-initialized. Accordingly, the time checking circuit 329 may newly count operation time for a next command set, and the count checking circuit 331 may newly count the number of completion responses generated in response to the next command set.

The read control circuit 333 may transmit read data output from the memory 340 to the second interface 312. According to an embodiment, the read data may be data read from the non-volatile memory 350 under the control of the memory controller 314. According to another embodiment, the read control circuit 333 may perform a read operation with the memory controller 314.

The write control circuit 335 may store write data transmitted from the second interface 312 in the memory 340. According to an embodiment, the write data stored in the memory 340 may be written in the non-volatile memory 350 under the control of the memory controller 314. According to another embodiment, the write control circuit 335 may perform a write operation with the memory controller 314.

A data interface DI of FIG. 2 may be the bus architecture 311, or an interface which can write data in the memory 340 or read data from the memory 340.

Figure 3:
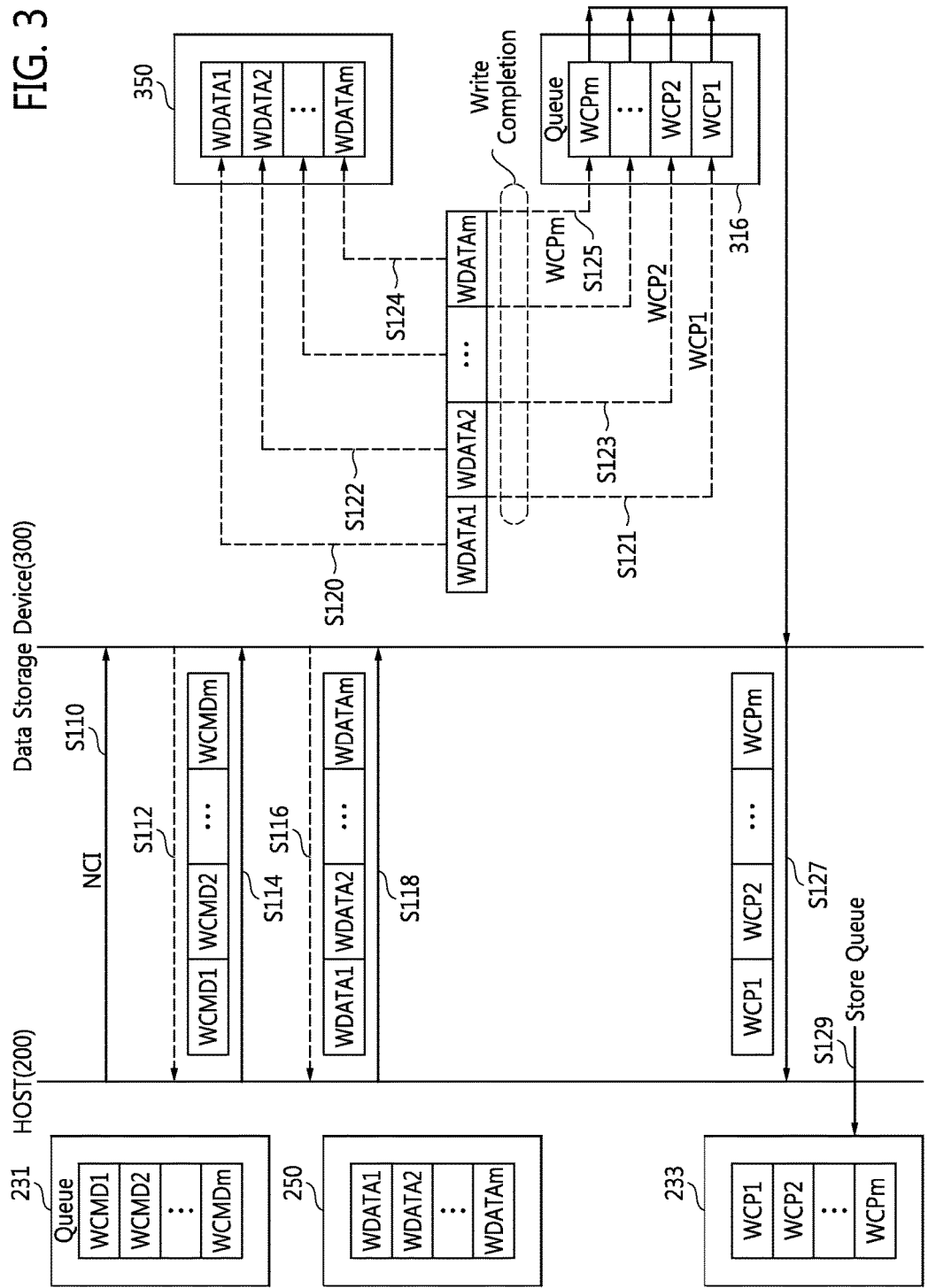
FIG. 3 is a data flow diagram describing write operations performed in the data processing system of FIG. 1.

FIG. 3 is a data flow describing write operations performed in the data processing system shown in FIG. 1.

With reference to FIGS. 1, 2 and 3, it assumed that one command set includes 'm' write commands (WCMD1 to WCMDm) corresponding to a reference count value Cref is m ('m' being a natural number). Moreover, it is assumed that the time required to process the m write commands WCMD1 to WCMDm (or time for storing m write completion responses WCP1 to WCPm in the buffer 316) is less than a reference time count value Tref. Accordingly, the time checking circuit 329 provides the first indication signal ARM1 having a first level (e.g., a logical 'low' or '0').

The CPU 220 of the host 200 may generate a plurality of write commands WCMD1 to WCMDm, and store a first queue 231 including the plurality of write commands WCMD1 to WCMDm in the buffer 230. According to an embodiment, the CPU 220 may generate indication data NCI which indicate the number of commands included (or stacked) in the first queue 231, and transmit the indication data NCI to the data storage device 300 through elements 210, 260, and 110 (S110).

The NVMe controller 315 may fetch the write commands WCMD1 to WCMDm included in the first queue 231 stored in the buffer 230 in response to the indication data NCI (S112 and S114).

The NVMe controller 315 may fetch each write data WDATA1 to WDATAm corresponding to each fetched write commands WCMD1 to WCMDm from the memory 250 of the host 200 (S116 and S118). According to an embodiment, the write data WDATA1 to WDATAm may be fetched in a burst mode. Here, each of the write data WDATA1 to WDATAm is assumed to include write (payload) data.

According to an embodiment, the NVMe controller 315 may store each of the fetched write data WDATA1 to WDATAm in the non-volatile memory 350. According to another embodiment, the memory controller 314 may store each of the fetched write data WDATA1 to WDATAm in the non-volatile memory 350. According to still another embodiment, when the NVMe controller 315 writes each of the fetched write data WDATA1 to WDATAm in the memory 340, the memory controller 314 may write each of the write data WDATA1 to WDATAm written in the memory 340 in the non-volatile memory 350.

For example, when first write data WDATA1 corresponding to a first write command WCMD1 is completely stored in the non-volatile memory 350, the NVMe controller 315 generates a first write completion response WCP1, and stores the first write completion response WCP1 in the buffer 316 (S121). At this time, a completion response generation engine 321 of the NVMe controller 315 may transmit the fourth indication signal IS2 which indicates the first write completion response WCP1 is generated to the count checking circuit 331. The count checking circuit 331 generates a count value in response to the clock signal CLK and the fourth indication signal IS2, and compares a generated count value with the reference count value Cref.

When the generated count value is less than the reference count value Cref, the count checking circuit 331 transmits the second indication signal ARM2 having the first level to the completion DMA controller 323. The completion DMA controller 323 does not immediately transmit the corresponding first write completion response WCP1 to the host 200 in response to the first indication signal ARM1 having a first level and the second indication signal ARM2 having a first level. That is, the completion DMA controller 323 does not fetch the first write completion response WCP1 from the buffer 316.

When second write data WDATA2 corresponding to a second write command WCMD2 is completely stored in the non-volatile memory 350 (S122), the NVMe controller 315 may generate a second write completion response WCP2, and store the second write completion response WCP2 in the buffer 316 (S123).

At this time, the completion response generation engine 321 of the NVMe controller 315 transmits the fourth indication signal IS2 which indicates the second write completion response WCP2 is generated to the count checking circuit 331. The count checking circuit 331 generates a count value in response to the clock signal CLK and the fourth indication signal IS2, and compares a generated count value with the reference count value Cref.

When the generated count value is less than the reference count value Cref, the count checking circuit 331 transmits the second indication signal ARM2 having a first level to the completion DMA controller 323.

The completion DMA controller 323 does not immediately transmit the second write completion response WCP2 to the host 200 in response to the first indication signal ARM1 having a first level and the second indication signal ARM2 having a first level. That is, the completion DMA controller 323 does not fetch the second write completion response WCP2 from the buffer 316.

When an $m^{th}$ write data WDATAm corresponding to a $m^{th}$ write command WCMDm is completely stored in the non-volatile memory 350 (S124), the NVMe controller 315 may generate a $m^{th}$ write completion response WCPm and store the $m^{th}$ write completion response WCPm in the buffer 316 (S125). At this time, the completion response generation engine 321 of the NVMe controller 315 transmits a fourth indication signal IS2 which indicates the $m^{th}$ write completion response WCPm is generated to the count checking circuit 331. The count checking circuit 331 generates a count value in response to the clock signal CLK and the fourth indication signal IS2, and compares a generated count value with the reference count value Cref.

When the generated count value is equal to the reference count value Cref, the count checking circuit 331 transmits the second indication signal ARM2 having a second level (e.g., a high level or logic 1) to the completion DMA controller 323.

The completion DMA controller 323 may fetch write completion responses WCP1 to WCPm stored in the buffer 316 and transmit fetched write completion responses WCP1 to WCPm to the host 200 during a single transaction in response to the first indication signal ARM1 having a first level and a second indication signal ARM2 having a second level (S127). For example, the completion DMA controller 323 may fetch the write completion responses WCP1 to WCPm stored in the buffer 316 referring to the reference count value Cref.

When the fetched write completion responses WCP1 to WCPm are transmitted to the host 200 during a single transaction, a count value counted by the count checking circuit 331 may be reset. For example, the completion DMA controller 323 may transmit an indication signal which indicates the write completion responses WCP1 to WCPm are transmitted to the host 200 during a single transaction to the time checking circuit 329 and the count checking circuit 331. The indication signal may be used as a reset signal.

The host 200 may store a second queue 233 including the fetched write completion responses WCP1 to WCPm in the buffer 230 (S129). The data storage device 300, e.g., the CPU 313 or the queue manager 317, may generate an interrupt which indicates the fetched write completion responses WCP1 to WCPm are transmitted to the host 200 during a single transaction, and transmit the generated interrupt to the host 200. The host 200, e.g., the CPU 220, may read the completion responses WCP1 to WCPm stored in the second queue 233 in response to a received interrupt, and complete a processing procedure of write commands WCMD1 to WCMDm.

Figure 4:
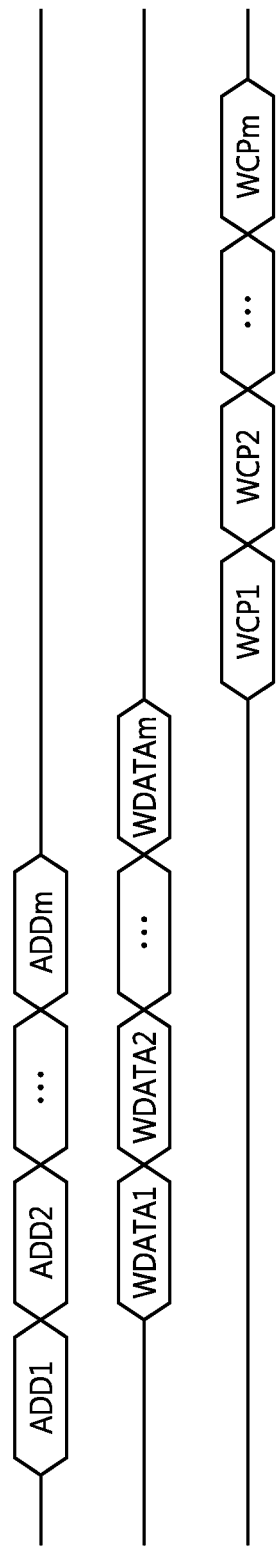
FIG. 4 is a write transaction timing diagram illustrating the use of an AXI bus included in the data processing system of FIG. 1.

FIG. 4 is a write transaction timing diagram illustrating the use of an AXI bus included in the data processing system of FIG. 1. When assuming that the bus architecture 311 of the data storage device 300 uses an AXI bus protocol, sequential write data WDATA1 to WDATAm corresponding to sequential addresses ADD1 to ADDm may be transmitted to the host 200 in a burst. Thus, the sequential write data WDATA1 to WDATAm may be transmitted as burst write data.

That is, the NMVe controller 315 according to an embodiment of the inventive concept does not immediately transmit each of the write completion responses WCP1 to WCPm to the host 200 whenever each of the write completion responses WCP1 to WCPm is generated, but instead transmits write completion responses WCP1 to WCPm, as a unitary completion packet, corresponding to the reference count value Cref to the host during a single transaction when the write completion responses WCP1 to WCPm corresponding to the reference count value Cref are stacked in the buffer 316 (S127).

In contrast, when a burst including sequential write data WDATA1 to WDATAm is broken by certain conventional data storage devices, a certain amount of time is required to calculate each of addresses ADD1 to ADDm, and/or a certain amount of time is required waiting for each of the write completion responses WCP1 to WCPm associated with a command set including write commands WCMD1 to WCMDm, thereby deteriorating performance of the conventional data processing systems.

However, the data processing system 100 according to an embodiment of the inventive concept may transmit a set of fetched write completion responses WCP1 to WCPm to the host 200 during a single transaction, such that a unitary burst of write data including sequential write data WDATA1 to WDATAm need not be broken. Accordingly, performance of the data processing system 100 can be improved.

Figure 5:
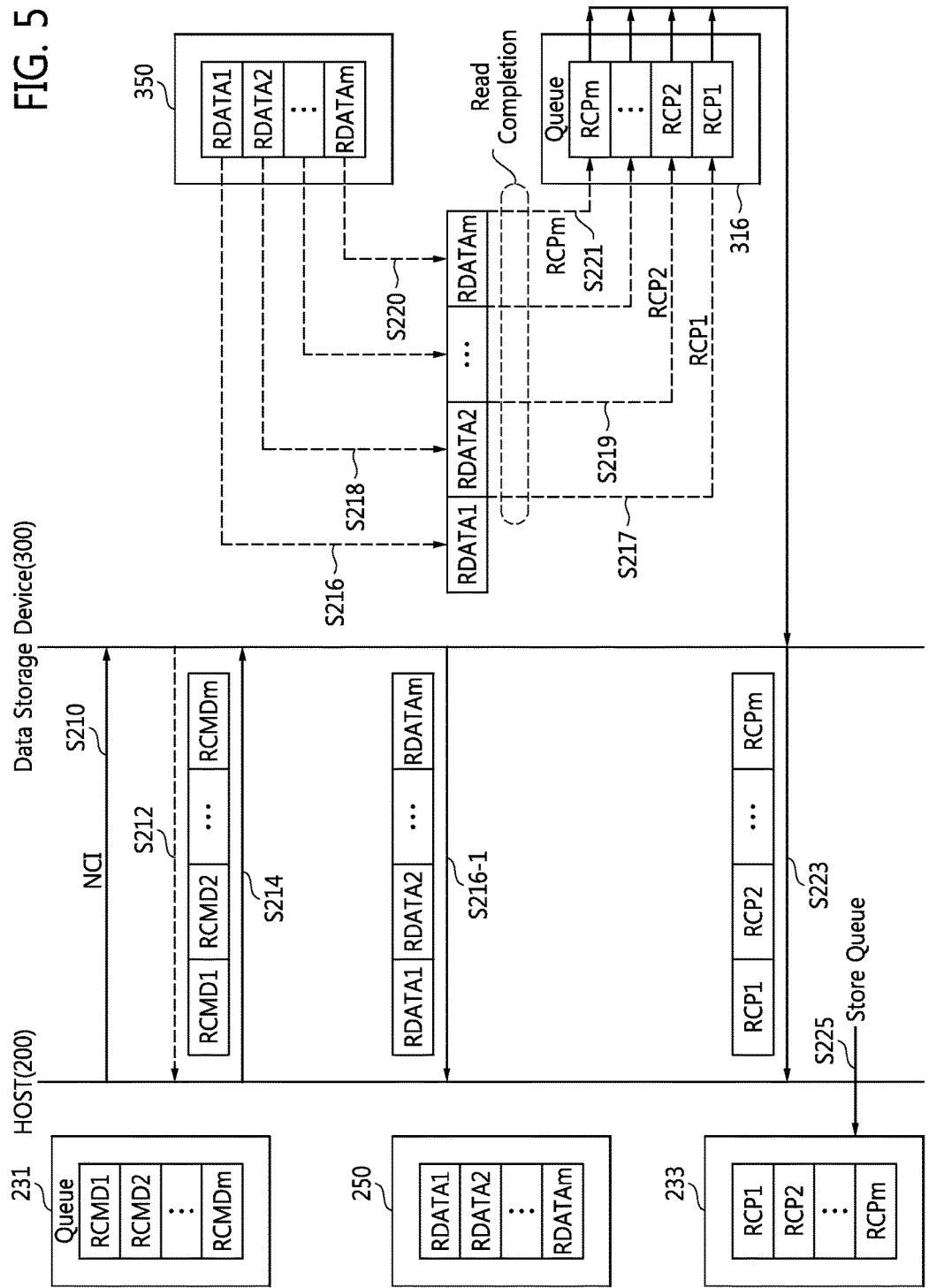
FIG. 5 is a data flow diagram describing read operations performed in the data processing system of FIG. 1.

FIG. 5 is a data flow diagram describing read operations performed in the data processing system of FIG. 1. Read operations performed in the data processing system 100 will be described with reference to FIGS. 1, 2, 5, and 6.

It is assumed that a command set includes 'm' read commands RCMD1 to RCMDm corresponding to a reference count value Cref of m. Moreover, it is assumed that time required to execute the m read commands RCMD1 to RCMDm, or time required to store the m read completion responses RCP1 to RCPm in the buffer 316 is less than a reference time count value Tref. Accordingly, the condition determination circuit 327, e.g., the time checking circuit 329, may output the first indication signal ARM1 having the first level.

The CPU 220 of the host 200 may generate a plurality of read commands RCMD1 to RCMDm, and store a first queue 231 including the plurality of read commands RCMD1 to RCMDm in the buffer 230. According to an embodiment, the CPU 220 may generate indication data NCI which indicate the number of commands included (or stacked) in the first queue 231, and transmit the indication data NCI to the data storage device 300 through the elements 210, 260, and 110 (S210).

The NVMe controller 315 may fetch the read commands RCMD1 to RCMDm included in the first queue 231 stored in the buffer 230 in response to the indication data NCI (S212 and S214). The NVMe controller 315 may fetch read data RDATA1 to RDATAm corresponding to each of the fetched read commands RCMD1 to RCMDm from the non-volatile memory 550 (S216, S218, . . . , S220). Each of the read data RDATA1 to RDATAm is read (payload) data.

According to an embodiment, the memory controller 314 may store each of the fetched read data RDATA1 to RDATAm in the memory 340. According to another embodiment, the memory controller 314 may transmit each of the fetched read data RDATA1 to RDATAm to the NVMe controller 315 through the bus architecture 311.

For example, a first read data RDATA1 corresponding to a first read command RCMD1 is completely stored in the memory 250 of the host 200 (S216-1), the NVMe controller 315 may generate a first read completion response RCP1 and store the first read completion response RCP1 in the buffer 316 (S217). At this time, the completion response generation engine 321 of the NVMe controller 315 transmits the fourth indication signal IS2 which indicates the first read completion response RCP1 is generated to the count checking circuit 331.

The count checking circuit 331 generates a count value in response to the clock signal CLK and the fourth indication signal IS2, and compares a generated count value with the reference count value Cref. When the generated count value is less than the reference count value Cref, the count checking circuit 331 transmits the second indication signal ARM2 having a first level to the completion DMA controller 323. The completion DMA controller 323 does not immediately transmit a first read completion response RCP1 to the host 200 in response to the first indication signal ARM1 having a first level and the second indication signal ARM2 having a first level. That is, the completion DMA controller 323 does not fetch the first read completion response RCP1 from the buffer 316.

When a second read data RDATA2 corresponding to a second read command RCMD2 is completely stored in the memory 250 of the host 200 (S216-1), the NVMe controller 315 generates a second read completion response RCP2 and stores the second read completion response RCP2 in the buffer 316 (S219). At this time, the completion response generation engine 321 of the NVMe controller 315 transmits the fourth indication signal IS2 which indicates the second read completion response RCP2 is generated to the count checking circuit 331. The count checking circuit 331 generates a count value in response to the clock signal CLK and the fourth indication signal IS2, and compares a generated count value with the reference count value Cref.

When the generated count value is less than the reference count value Cref, the count checking circuit 331 transmits the second indication signal ARM2 having a first level to the completion DMA controller 323.

The completion DMA controller 323 does not immediately transmit the second read completion response RCP2 to the host 200 in response to the first indication signal ARM1 having a first level and the second indication signal ARM2 having a first level. That is, the completion DMA controller 323 does not fetch the second read completion response RCP2 from the buffer 316.

When a m$^{th}$ read data RDATAm corresponding to a m$^{th}$ read command RCMDm is completely stored in the memory 250 of the host 200 (S216-1), the NVMe controller 315 generates a m$^{th}$ read completion response RCPm, and store the m$^{th}$ read completion response RCPm in the buffer 316 (S221). At this time, the completion response generation engine 321 of the NVMe controller 315 transmits the fourth indication signal IS2 which indicates the m$^{th}$ read completion response RCPm is generated to the count checking circuit 331. The count checking circuit 331 generates a count value in response to the clock signal CLK and the fourth indication signal IS2, and compares a generated count value with the reference count value Cref.

When the generated count value is equal to the reference count value Cref, the count checking circuit 331 transmits the second indication signal ARM2 having a second level to the completion DMA controller 323.

The completion DMA controller 323 may fetch read completion responses RCP1 to RCPm stored in the buffer 316 and transmit fetched read completion responses RCP1 to RCPm to the host 200 during a single transaction in response to the first indication signal ARM1 having a first level and the second indication signal ARM2 having a second level (S223). For example, the completion DMA controller 323 may fetch the read completion responses RCP1 to RCPm stored in the buffer 316 referring to the reference count value Cref.

When the fetched read completion responses RCP1 to RCPm are transmitted to the host 200 during a single transaction, a count value counted by the count checking circuit 331 may be reset. For example, the completion DMA controller 323 may transmit an indication signal which indicates the read completion responses are transmitted to the host 200 during a single transaction to the time checking circuit 329 and the count checking circuit 331. The indication signal may be used as a reset signal.

The host 200 may store a second queue 233 including the fetched read completion responses RCP1 to RCPm in the buffer 230 (S225). The data storage device 300, e.g., the CPU 313 or the queue manager 317, may generate an interrupt which indicates the fetched read completion responses RCP1 to RCPm are transmitted to the host 200 during a single transaction, and may transmit a generated interrupt to the host 200. The host 200, e.g., the CPU 220, may read the read completion responses RCP1 to RCPm stored in the second queue 233 in response to a received interrupt, and complete a processing procedure for the read commands RCMD1 to RCMDm.

Figure 6:
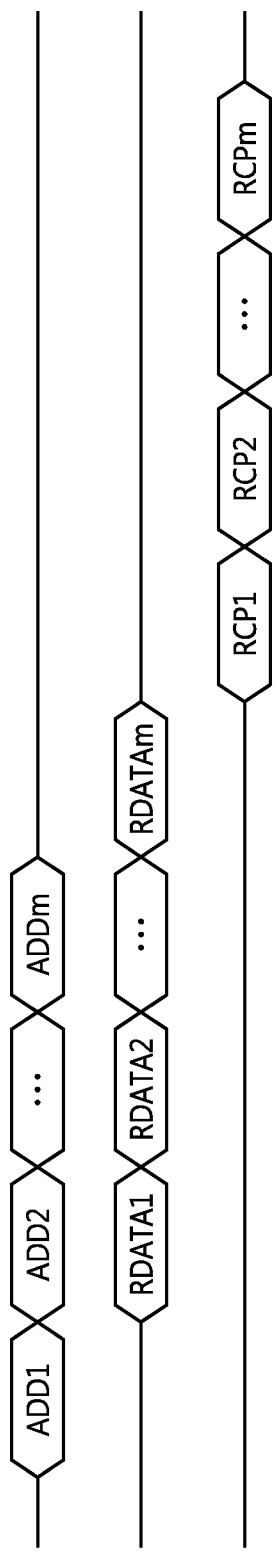
FIG. 6 is a read transaction timing diagram describing use of the AXI bus included in the data processing system of FIG. 1.

FIG. 6 is a read transaction timing diagram illustrating the use of an AXI bus included in the data processing system of FIG. 1. When assuming that the bus architecture 311 of the data storage device 300 uses an AXI bus protocol, sequential read data RDATA1 to RDATAm corresponding to sequential addresses ADD1 to ADDm may be transmitted to the host 200 in a burst.

That is, the NMVe controller 315 according to an embodiment of the inventive concept does not immediately transmit each of the read completion responses RCP1 to RCPm to the host 200 whenever each of the read completion responses is generated, and when the read completion responses RCP1 to RCPm corresponding to the reference count value are stacked in the buffer 316, the NVMe controller 315 may transmit the read completion responses RCP1 to RCPm corresponding to the reference count value Cref to the host 200 during a single transaction (S223).

When a burst including the sequential read data RDATA1 to RDATAm is broken in a data storage device of the related art, time for calculating each of the addresses ADD1 to ADDm and/or time for waiting for each of the read completion responses RCP1 to RCPm are needed for each of the read commands RCMD1 to RCMDm, thereby deteriorating performance of the data processing system of the related art.

However, the data processing system 100 according to an embodiment of the inventive concept transmits the fetched read completion responses RCP1 to RCPm to the host during a single transaction, such that the burst including the sequential read data RDATA1 to RDATAm does not break. Accordingly, performance of the data processing system 100 can be improved.

Figure 7:
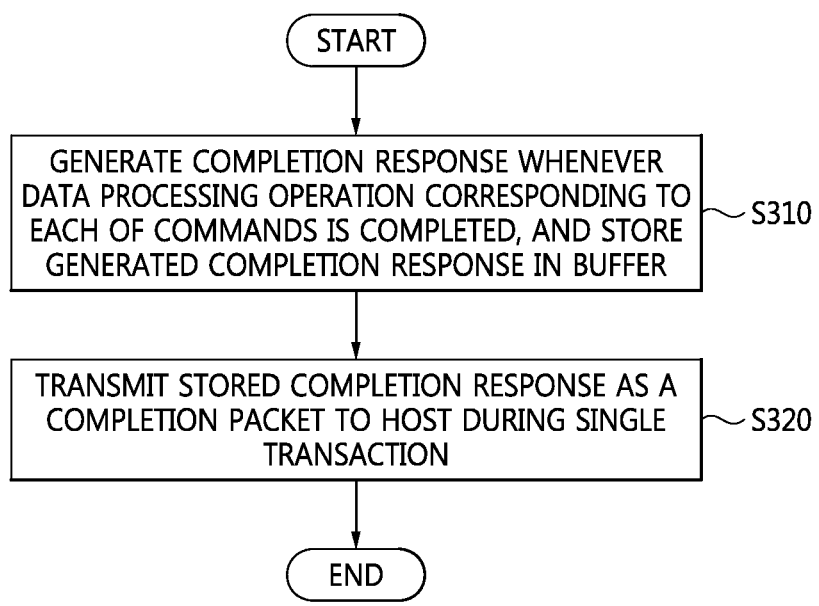
FIG. 7 is a general flowchart summarizing operation of the data processing system of FIG. 1.

FIG. 7 is a flowchart generally summarizing operation of the data processing system of FIG. 1. Referring to FIGS. 1, 2, and 7, the data storage device 300 generates a completion response of given type (e.g., a write completion response or a read completion response) whenever a corresponding data access operation (e.g., a write operation or a read operation) indicated by a corresponding data access command (e.g., a write command or a read command) is completed. As generated in this manner, the respective completion responses are stored in the buffer 316 (S310). The data storage device 300 may then transmit the accumulated completion responses stored in the buffer 316 to the host 200 as a single completion packet during a single transaction (S320).

Figure 8:
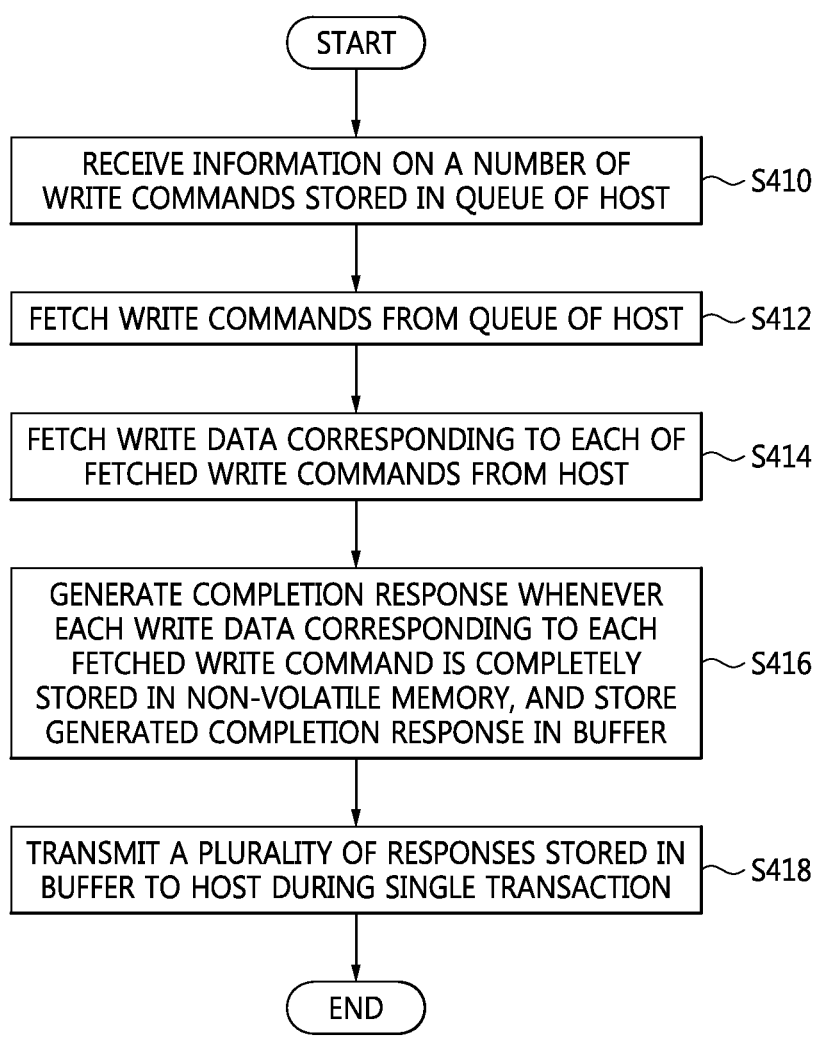
FIG. 8 is a flowchart summarizing write operations performed in the data processing system of FIG. 1.

FIG. 8 is a flowchart summarizing operation of the data processing system of FIG. 1 in response to a command set including a number of write commands. Referring to FIGS. 1, 2, 3, 4 and 8, the data storage device 300 receives indication data NCI indicating a number of write commands WCMD1 to WCMDm included (or stored) in the first queue 231 of the host 200 from the host 200 (S410).

The data storage device 300 fetches the write commands WCMD1 to WCMDm included (or stored) in the first queue 231 in response to the indication data NCI (S412). The data storage device 300 may fetch write data WDATA1 to WDATAm corresponding to each of the fetched write commands WCMD1 to WCMDm from the memory 250 of the host 200 (S414).

The data storage device 300 then generates a write completion response whenever each of write data WDATA1 to WDATAm corresponding to each of fetched write commands WCMD1 to WCMDm is completely stored in the non-volatile memory 350, and stores the generated write completion response in the buffer 316 (S416). That is, the data storage device 300 does not immediately transmit a write completion response generated whenever each of the write data WDATA1 to WDATAm is completely stored in the non-volatile memory 350.

The data storage device 300 may fetch one or more write completion responses stored in the buffer 316 and transmit the one or more fetched write completion responses to the host 200 as a completion packet during a single transaction under the control of the condition determination circuit 327. More specifically, the data storage device 300 may fetch one or more write completion responses stored in the buffer 316 and transmit the one or more fetched write completion responses to the host 200 during a single transaction under the control of the time checking circuit 329 or the count checking circuit 331.

As described above, even when the data storage device 300 generates a single write completion response in response to a command set including only a single write command, the data storage device 300 does not necessarily need to immediately transmit the corresponding write completion response to the host 200, but instead, may store the write completion response in the buffer 316, and thereafter, transmit the write completion response stored in the buffer 316 to the host 200 with the elapse of time corresponding to a reference time count value.

Figure 9:
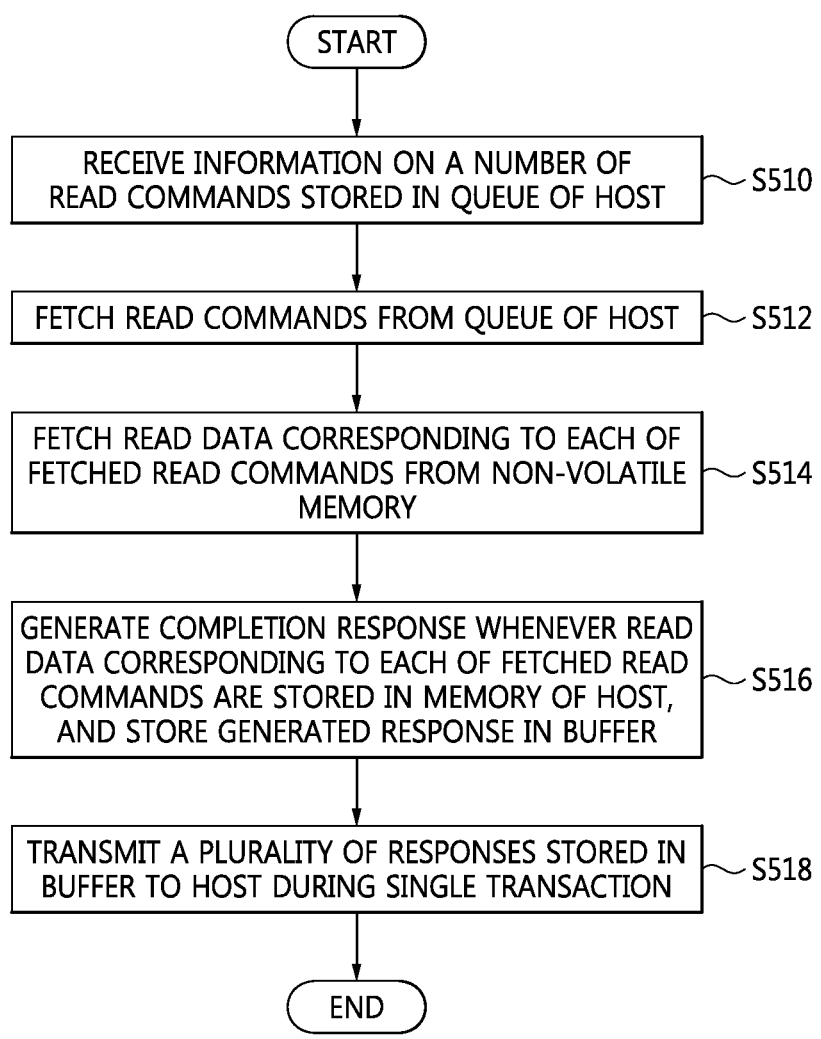
FIG. 9 is a flowchart summarizing read operations performed in the data processing system of FIG. 1.

FIG. 9 is a flowchart summarizing operation of the data processing system of FIG. 1 in response to a command set including a number of read commands. Referring to FIGS. 1, 2, 5, 6, and 9, the data storage device 300 receives indication data NCI indicating a number of read commands RCMD1 to RCMDm included (or stored) in the first queue 231 of the host 200 form the host 200 (S510).

The data storage device 300 fetches the read commands RCMD1 to RCMDm included (or stored) in the first queue 231 in response to the indication data NCI (S512). The data storage device 300 may fetch the read data RDATA1 to RDATAm corresponding to each of the fetched read commands RCMD1 to RCMDm from the non-volatile memory 550 (S514).

The data storage device 300 generates a read completion response and stores the read completion response in the buffer 316 whenever each of the read data RDATA1 to RDATAm corresponding to each of the fetched read commands RCMD1 to RCMDm is completely stored in the memory 250 of the host 200 (S516). That is, the data storage device 300 does not immediately transmit the read completion response generated whenever each of the read data RDATA1 to RDATAm is completely stored in the memory 250 of the host 200 to the host 200.

The data storage device 300 may fetch one or more read completion responses stored in the buffer 316 and transmit one or more fetched read completion responses to the host 200 during a single transaction according to a control of the time checking circuit 329 or the count checking circuit 331 (S518).

As described above, even when the data storage device 300 receives a command set including only a single read a command, the resulting completion response need not be immediately transmitted to the host 200, but may instead be stored in the buffer 316 and transmitted from the buffer 316 to the host 200 with the elapse of time corresponding to the reference time count value.

Figure 10:
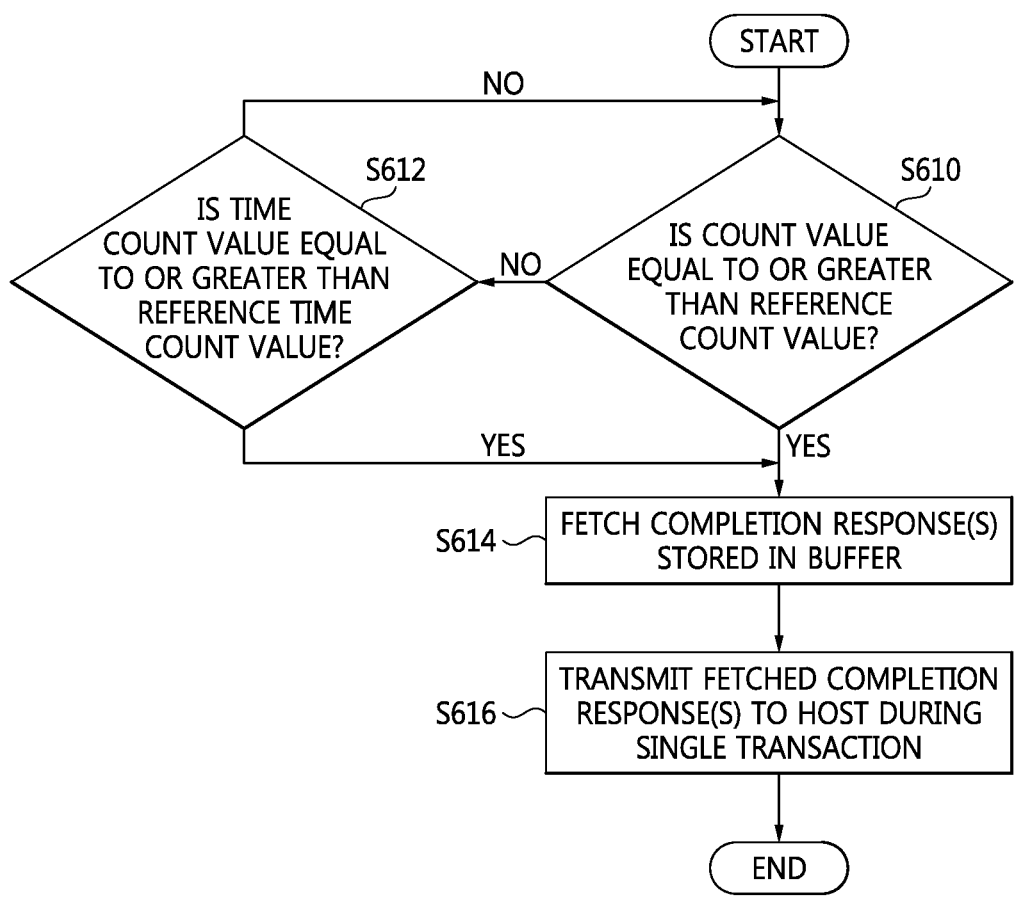
FIG. 10 is a flowchart summarizing operation of the data processing system of FIG. 1 according to a time condition or a count condition.

FIG. 10 is a flowchart summarizing the operation of the data processing system shown in FIG. 1 according to a time condition or a count condition. Referring to FIGS. 1, 2, and 10, the data storage device 300, particularly the NVMe controller 315, may transmit one or more completion responses stored in the buffer 316 to the host 200 during a single transaction in response to certain condition information (e.g., the reference count value Cref and/or the reference time count value Tref).

For convenience of description, it is assumed that the reference count value Cref is three (3), time corresponding to the reference time count value Tref is two (2) seconds, the number of commands stored in the first queue 231 is three (3), and three write completion responses WCP1, WCP2, and WCP3 are stored in the buffer 316 within two seconds.

When first write data WDATA1 is completely stored in the non-volatile memory 350, the completion response generation engine 321 may generate a first write completion response WCP1 and store the first write completion response WCP1 in the buffer 316. At this time, the completion response generation engine 321 transmits the fourth indication signal IS2 which indicates a generation of the first write completion response WCP1 to the count checking circuit 331.

The count checking circuit 331 generates a count value (e.g., 1) in response to the clock signal CLK and the fourth indication signal IS2, and compares a generated count value (e.g., 1) with a reference count value (Cref=3) (S610). Since the generated count value (e.g., 1) is less than the reference count value (Cref=3), the count checking circuit 331 transmits the second indication signal ARM2 having a first level to the completion DMA controller 323.

Moreover, the time checking circuit 329 compares a time count value with a reference time count value Tref, and when the time count value is less than the reference time count value Tref (S612), the time checking circuit 329 transmits the first indication signal ARM1 having a first level to the completion DMA controller 323.

The completion DMA controller 323 does not fetch the first write completion response WCP1 stored in the buffer 316 in response to the first indication signal ARM1 having a first level and the second indication signal ARM2 having a first level.

When the second write data WDATA2 is completely stored in the non-volatile memory 350, the completion response generation engine 321 may generate a second write completion response WCP2 and store the second write completion response WCP2 in the buffer 316. At this time, the completion response generation engine 321 transmits the fourth indication signal IS2 which indicates a generation of the second write completion response WCP2 to the count checking circuit 331.

The count checking circuit 331 generates a count value (e.g., 2) in response to the clock signal CLK and the fourth indication signal IS2, and compares a generated count value (e.g., 2) with a reference count value (Cref=3) (S610). Since the generated count value (e.g., 2) is less than the reference count value (Cref=3), the count checking circuit 331 transmits the second indication signal ARM2 having a first level to the completion DMA controller 323.

Moreover, the time checking circuit 329 compares a time count value with a reference time count value Tref, and transmits the first indication signal ARM1 having a first level to the completion DMA controller 323 when the time count value is less than the reference time count value Tref.

The completion DMA controller 323 does not fetch each of write completion responses WCP1 and WCP2 stored in the buffer 316 in response to the first indication signal ARM1 having a first level and the second indication signal ARM2 having a first level.

When a third write data WDATA3 is completely stored in the non-volatile memory 350, the completion response generation engine 321 may generate a third write completion response WCP3 and store the third write completion response WCP3 in the buffer 316. At this time, the completion response generation engine 321 transmits the fourth indication signal IS2 which indicates a generation of the third write completion response WCP3 to the count checking circuit 331.

The count checking circuit 331 generates a count value (e.g., 3) in response to the clock signal CLK and the fourth indication signal IS2, and compares a generated count value (e.g., 3) with a reference count value (Cref=3) (S610). Since the generated count value (e.g., 3) is equal to the reference count value (Cref=3), the count checking circuit 331 transmits the second indication signal ARM2 having a second level to the completion DMA controller 323.

Moreover, the time checking circuit 329 compares a time count value with the reference time count value Tref, and transmits the first indication signal ARM1 having a first level to the completion DMA controller 323 when the time count value is less than the reference time count value Tref (S612).

The completion DMA controller 323 may fetch write completion responses WCP1, WCP2, and WCP3 stored in the buffer 316 in response to the first indication signal ARM1 having a first level and the second indication signal ARM2 having a second level (S614), and transmit fetched write completion responses WCP1, WCP2, and WCP3 to the host 200 in a burst at a time (S616).

When the fetched write completion responses WCP1, WCP2, and WCP3 are transmitted to the host 200, a count value counted by the count checking circuit 331 is initialized.

For convenience of description, it is assumed that the reference count value Cref is two, time corresponding to the reference time count value Tref is two seconds, the number m of commands stored in the first queue 231 is three, and two write completion responses WCP1 and WCP2 are stored in the buffer 316 within two seconds.

When a first write data WDATA1 is completely stored in the non-volatile memory 350, the completion response generation engine 321 may generate the first write completion response WCP1 and store the first write completion response WCP1 in the buffer 316. At this time, the completion response generation engine 321 transmits the fourth indication signal IS2 which indicates a generation of the first write completion response WCP1 to the count checking circuit 331.

The count checking circuit 331 generates a count value (e.g., 1) in response to the clock signal CLK and the fourth indication signal IS2, and compares a generated count value (e.g., 1) with a reference count value (Cref=2) (S610). Since the generated count value (e.g., 1) is less than the reference count value (Cref=2), the count checking circuit 331 transmits the second indication signal ARM2 having a first level to the completion DMA controller 323.

Moreover, the time checking circuit 329 compares a time count value with a reference time count value Tref, and transmits the first indication signal ARM1 having a first level to the completion DMA controller 323 when the time count value is less than the reference time count value Tref.

The completion DMA controller 323 does not fetch the first write completion response WCP1 stored in the buffer 316 in response to the first indication signal ARM1 having a first level and the second indication signal ARM2 having a first level.

When the second write data WDATA2 is completely stored in the non-volatile memory 350, the completion response generation engine 321 may generate a second write completion response WCP2, and store the second write completion response WCP2 in the buffer 316. At this time, the completion response generation engine 321 transmits a fourth indication signal IS2 which indicates a generation of the second write completion response WCP2 to the count checking circuit 331.

The count checking circuit 331 generates a count value (e.g., 2) in response to the clock signal CLK and the fourth indication signal IS2, and compares a generated count value (e.g., 2) with the reference count value (Cref=2) (S610). Since the generated count value (e.g., 2) is equal to the reference count value (Cref=2), the count checking circuit 331 transmits the second indication signal ARM2 having a second level to the completion DMA controller 323.

Moreover, the time checking circuit 329 compares a time count value with a reference time count value Tref, and transmits the first indication signal ARM1 having a first level to the completion DMA controller 323 when the time count value is less than the reference time count value Tref (S612).

The completion DMA controller 323 fetches write completion response WCP1 and WCP2 stored in the buffer 316 in response to the first indication signal ARM1 having a first level and the second indication signal ARM2 having a second level (S614), and transmit fetched write completion responses WCP1 and WCP2 to the host 200 in a burst at a time (S616).

When the fetched write completion responses WCP1 and WCP2 are transmitted to the host 200, a count value counted by the count checking circuit 331 is initialized. When a third write data WDATA3 is completely stored in the non-volatile memory 350, the completion response generation engine 321 may generate a third write completion response WCP3 and store the third write completion response WCP3 in the buffer 316. At this time, the completion response generation engine 321 transmits the fourth indication signal IS2 which indicates a generation of the third write completion response WCP3 to the count checking circuit 331.

The count checking circuit 331 generates a count value (e.g., 1) in response to the clock signal CLK and the fourth indication signal IS2, and compares the generated count value (e.g., 1) with the reference count value (Cref=2) (S610).

Since the generated count value (e.g., 1) is less than the reference count value (Cref=2), the count checking circuit 331 transmits the second indication signal ARM2 having a first level to the completion DMA controller 323. Moreover, the time checking circuit 329 compares the time count value with the reference time count value Tref, and transmits the first indication signal ARM1 having a first level to the completion DMA controller 323 when the time count value is less than the reference time count value Tref (S612).

The completion DMA controller 323 does not fetch the first write completion response WCP1 stored in the buffer 316 in response to the first indication signal ARM1 having a first level and the second indication signal ARM2 having a first level. However, when two seconds which is set passes as time elapses, that is, when the time count value is more than the reference time count value Tref, the time checking circuit 329 transmits the first indication signal ARM1 having a second level to the completion DMA controller 323.

The completion DMA controller 323 may fetch a write completion response WCP3 stored in the buffer 316 (S614) and transmit a fetched write completion response WCP3 to the host 200 in response to the first indication signal ARM1 having a second level and the second indication signal ARM2 having a first level (S616). Accordingly, the buffer 316 becomes empty.

Figure 11:
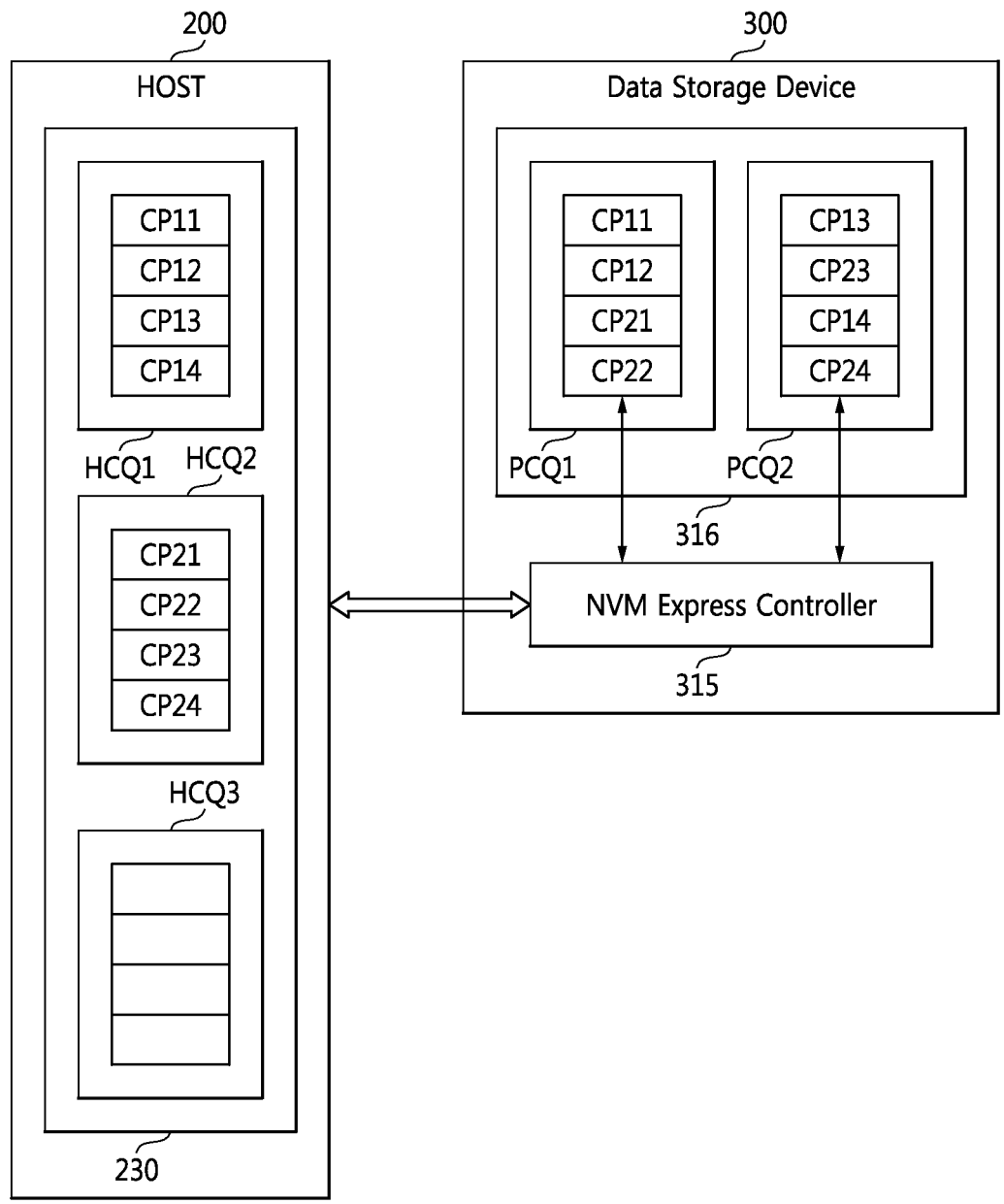
FIG. 11 is a block diagram illustrating an operation performed by the data processing system of FIG. 1.

FIG. 11 is a block diagram illustrating operation of the data processing system of FIG. 1. Referring to FIGS. 1, 2, and 11, the NVMe controller 315 may extract a plurality of completion responses CP11 and CP12 to be stored in the first queue HCQ1 of the buffer 230 of the host 200 from a plurality of completion responses CP11, CP12, CP21, and CP22 stored (or included) in the first queue PCQ1 of the buffer 316.

Moreover, the NVMe controller 315 may extract a plurality of completion responses CP13 and CP14 to be stored in the first queue HCQ1 of the buffer 230 of the host 200 from a plurality of completion responses CP13, CP23, CP14, and CP24 stored (or included) in the second queue PCQ2 of the buffer 316. When the NVMe controller 315 sequentially transmits the completion responses CP11, CP12, CP13, and CP14 as a first extracted completion packet to the host 200 during a single transaction, the host 200 may store the completion responses CP11, CP12, CP13, and CP14 of the first completion packet as the first queue HCQ1.

The NVMe controller 315 may then extract completion responses CP21 and CP22 to be stored in a second queue HCQ2 of the buffer 230 of the host 200 from the first completion packet including completion responses CP11, CP12, CP21, and CP22 stored in the first queue PCQ1 of the buffer 316. Moreover, the NVMe controller 315 may extract completion responses CP23 and CP24 to be stored in the second queue HCQ2 of the buffer 230 of the host 200 from the first completion packet including completion responses CP13, CP23, CP14, and CP24 stored in the second queue PCQ2 of the buffer 316.

When the NVMe controller 315 sequentially transmits the completion responses CP21, CP22, CP23, and CP24 as a completion packet during a single transaction, the host 200 may store the completion responses CP21, CP22, CP23, and CP24 transmitted from the data storage device 300 in the second queue HCQ2.

The completion responses CP11, CP12, CP21, and CP22 stored in the first queue PCQ1 of the data storage device 300 may be completion responses generated by the NVMe controller 315 whenever a data access operation (e.g., a write operation or a read operation) corresponding to each of commands (e.g., write commands or read commands) is completed.

Moreover, the completion responses CP13, CP23, CP14, and CP24 stored in the second queue PCQ2 of the data storage device 300 may be completion responses generated by the NVMe controller 315 whenever a data access operation (e.g., a write operation or a read operation) corresponding to each of commands (e.g., write commands or read commands) is completed.

Figure 12:
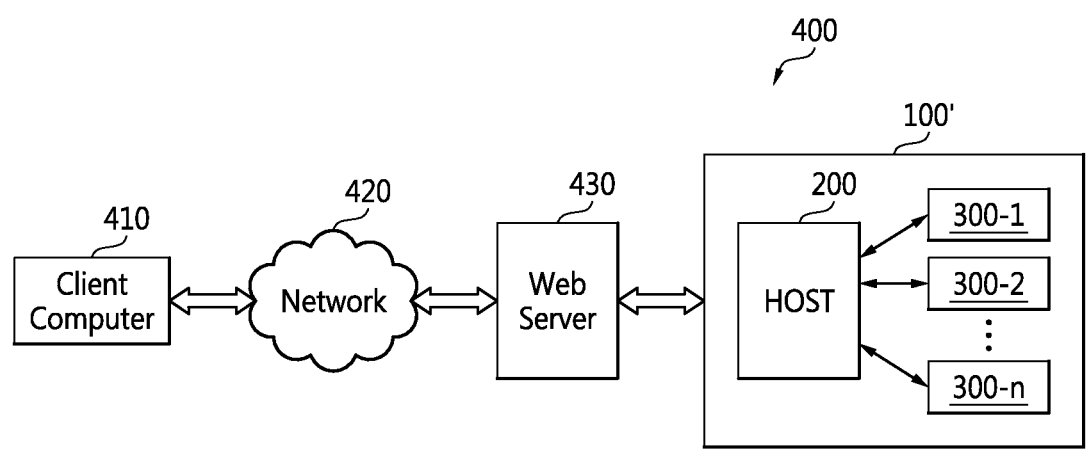
FIG. 12 is a block diagram illustrating a search system including the data processing system of FIG. 1.

FIG. 12 is a block diagram illustrating a search system including a data processing system 100' like the one shown in FIG. 1. Referring to FIGS. 1 to 12, a search system 400 include a client computer 410, a network 420, a web server 430, and the data processing system 100'.

The search system 400 may be embodied as a system which can provide an internet portal service or a web portal service. According to another embodiment, the search system 400 may be a data center or an internet data center. The client computer 410 may be connected to the web server 430 through the network 420. The network 420 may be a network which supports a wireless internet, a wired internet, or WiFi.

The web server 430 may be connected to the data processing system 100' through the network. The data processing system 100' may include the host 200 and a plurality of data storage devices 300-1 to 300-$n$. A structure and an operation of each of the plurality of data storage devices 300-1 to 300-$n$ are substantially the same as or similar to a structure and an operation of the data storage device 300 described referring to FIGS. 1 to 11.

A data storage device according to an embodiment of the inventive concept need not immediately transmit a completion response to a host whenever each of a plurality of commands is completed so as to improve performance, but may instead store (or accumulate) completion responses corresponding to one or more commands in a designated buffer (e.g., in a queue form), and thereafter, sequentially transmit the stored completion responses to the host during a single transaction.

Although a few embodiments of the present general inventive concept have been shown and described, it will be appreciated by those skilled in the art that changes may be made in these embodiments without departing from the scope of the inventive concept as defined by the appended claims and their equivalents.

What is claimed is:

1. A method for operating a solid-state drive (SSD) that receives a command set including a plurality of commands from a queue in a host, the method comprising:

for each of the plurality of commands in the command set received from the queue in the host, generating a completion response upon completing a corresponding data access operation indicated by the command, and aggregating and storing each completion response for the plurality of commands in a buffer of the SSD separate from a non-volatile memory of the SSD to generate a completion packet including each completion response for and corresponding to the plurality of commands of the command set;

generating the completion packet including each completion response for the plurality of commands of the command set, and thereafter, transmitting the completion packet stored in the buffer to the host during a single transaction only after data access operations for the plurality of commands in the command set are completed.

2. The method of claim 1,
wherein the SSD includes a processor, the buffer, and the non-volatile memory on which data access operations corresponding to the plurality of commands are stored, and
wherein the transmitting of the completion packet occurs after a delay following completion of data access operations corresponding to the plurality of commands.

3. The method of claim 2,
wherein the SSD further includes a memory controller that interfaces with the non-volatile memory, and a bus which connects the buffer and the memory controller, and
wherein a duration of the delay is controlled by at least one of a first indication signal generated by a time checking circuit of the SSD and a second indication signal generated by a count checking circuit of the SSD.

4. The method of claim 1,
wherein the each of the plurality of commands includes a plurality of addresses that are sequentially arranged.

5. The method of claim 4,
wherein the plurality of commands are a plurality of write commands or a plurality of read commands.

6. The method of claim 1, wherein the plurality of commands in the command set received from the host include a plurality of write commands, and the method further comprises:
receiving in the SSD from the host, indication information indicating a number of the write commands stored in the queue of the host;
fetching the write commands from the queue in response to the indication information; and for each one of the write commands,
fetching corresponding write data from a memory of the host as fetched write data;
storing the fetched write data in the non-volatile memory of the SSD;
generating a corresponding completion response after storing the fetched write data in the non-volatile memory; and
storing the generated completion response in the buffer.

7. The method of claim 1, wherein the plurality of commands in the command set received from the host include a plurality of read commands, and the method further comprises:
receiving in the SSD from the host, indication information indicating a number of the read commands stored in the queue of the host;
fetching the read commands from the queue in response to the indication information; and for each one of the read commands,
retrieving read data indicated by the read command from the non-volatile memory of the SSD as retrieved read data; and
transmitting the retrieved read data from the SSD to the host;
generating a corresponding completion response after successfully transmitting the read data to the host; and
storing the generated completion response in the buffer.

8. The method of claim 1, further comprising:
sequentially transmitting each completion response from the SSD to the host in a burst under control of a Non-Volatile Memory Express (NVMe) controller of the SSD.

9. The method of claim 1,
wherein the transmitting of the completion packet is initiated upon receipt of an indication signal indicating fulfillment of an associated condition.

10. The method of claim 9,
wherein the indication signal is one of a first indication signal indicating that a reference time period has elapsed, and a second indication signal indicating that a number of completion responses equal to a number of commands in the command set are stored in the buffer.

11. The method of claim 10,
wherein the first indication signal is generated by comparing a time count value stored in a configuration register of the SSD with a count value derived from a clock signal.

12. The method of claim 10,
wherein the second indication signal is generated by comparing a reference count value stored in a configuration register of the SSD with a count value derived from a clock signal.

13. The method of claim 1,
wherein the transmitting of the completion packet stored in the buffer to the host comprises:
counting a number of completion responses in the completion packet and generating a reference count value; and
during the single transaction, sequentially fetching a number of completion responses from the buffer equal to the reference count value, and transmitting as the completion packet the fetched completion responses to the host.

14. The method of claim 1,
wherein the storing of the completion responses and the transmitting of the completion packet is performed under control of a Non-Volatile Memory (NVM) Express (NVMe) controller of the SSD, and the completion responses are stored in the buffer in a queue form.

15. A method for operating a solid-state drive (SSD) that receives a plurality of commands from a queue in a host, the method comprising:
for each command received from the host, generating a completion response upon completing a corresponding data access operation indicated by the command, and aggregating and storing each completion response in a buffer in the SSD separate from a non-volatile memory of the SSD;
using a Non-Volatile Memory Express (NVMe) controller of the SSD, extracting each completion response stored in the buffer to generate at least one completion packet;
generating the at least one completion packet including each completion response extracted from the buffer, and
transmitting a completion packet of the at least one completion packet to the host during a single transaction only after data access operations for the plurality of commands are completed.

16. The method of claim 15,
wherein each completion response extracted by the NVMe controller to generate a first completion packet includes a first completion response stored in a first queue of the buffer and a second completion response stored in a second queue of the buffer.

17. The method of claim 15, wherein the at least one completion packet includes a first completion packet and a second completion packet that are collectively transmitted to the host during the single transaction.

18. The method of claim 15, wherein at least two of the plurality of commands include addresses that are sequential.

19. The method of claim 15, wherein the plurality of commands received from the host are write commands, and the method further comprises:
   receiving in the SSD from the host, indication information indicating a number of the write commands stored in the queue of the host;
   fetching the write commands from the queue in response to the indication information; and for each one of the write commands,
      fetching corresponding write data from a memory of the host as fetched write data;
      storing the fetched write data in the non-volatile memory of the SSD;
      generating a corresponding completion response after storing the fetched write data in the non-volatile memory; and
      storing the generated completion response in the buffer.

* * * * *